(12) United States Patent
Hendricks, Sr.

(10) Patent No.: US 8,646,404 B2
(45) Date of Patent: Feb. 11, 2014

(54) MODULAR SYSTEM WITH PLATFORMED ROBOT, BOOTH, AND FLUID DELIVERY SYSTEM FOR TIRE SPRAYING

(76) Inventor: Todd E. Hendricks, Sr., Alvordton, OH (US)

( * ) Notice: Subject to any disclaimer, the term of this patent is extended or adjusted under 35 U.S.C. 154(b) by 193 days.

(21) Appl. No.: 13/245,209

(22) Filed: Sep. 26, 2011

(65) Prior Publication Data
US 2013/0078385 A1    Mar. 28, 2013

(51) Int. Cl.
| B05C 13/00 | (2006.01) |
| B05C 21/00 | (2006.01) |
| B05B 13/02 | (2006.01) |
| B05B 15/12 | (2006.01) |
| B01D 45/00 | (2006.01) |
| B05D 1/02 | (2006.01) |
| B05D 5/00 | (2006.01) |
| B05D 1/36 | (2006.01) |

(52) U.S. Cl.
USPC ........... 118/503; 118/305; 118/326; 118/668; 118/DIG. 7; 427/427.2; 427/421.1; 427/345; 427/407; 414/751.1; 55/443; 55/465; 55/DIG. 46; 901/43

(58) Field of Classification Search
USPC .......... 118/326, 668, 305, DIG. 7; 427/427.2, 427/421.1, 345, 407.1; 362/147; 414/751.1
See application file for complete search history.

(56) References Cited

U.S. PATENT DOCUMENTS

| 3,507,247 | A | | 4/1970 | Kwierant |
| 3,813,042 | A | * | 5/1974 | Szczepanski ................. 239/193 |
| 4,125,639 | A | | 11/1978 | Brandl |
| 4,728,274 | A | * | 3/1988 | Siegenthaler ................ 425/34.1 |
| 4,778,060 | A | | 10/1988 | Wessner, Jr. |
| 5,153,034 | A | * | 10/1992 | Telchuk et al. ............... 427/424 |
| 5,188,904 | A | | 2/1993 | Graves |
| 5,268,580 | A | | 12/1993 | He |
| 5,292,066 | A | * | 3/1994 | Torii et al. ......................... 239/1 |
| 5,315,222 | A | * | 5/1994 | Kasagami et al. ........ 318/568.11 |
| 5,397,394 | A | * | 3/1995 | Orr ............................... 118/634 |
| 5,429,682 | A | | 7/1995 | Harlow et al. |
| 5,438,647 | A | * | 8/1995 | Nagamatsu et al. .......... 700/247 |
| 5,631,028 | A | * | 5/1997 | Mizokawa et al. .......... 425/28.1 |
| 6,077,469 | A | | 6/2000 | Golightly et al. |
| 6,197,115 | B1 | * | 3/2001 | Barrey et al. ................. 118/681 |
| 6,591,160 | B2 | * | 7/2003 | Hine et al. .................... 700/218 |
| 6,946,032 | B2 | * | 9/2005 | Pohl et al. ..................... 118/308 |
| 7,399,362 | B2 | * | 7/2008 | Pohl et al. ..................... 118/313 |
| 7,567,855 | B2 | * | 7/2009 | Salamanca ................... 700/245 |
| 7,904,201 | B2 | * | 3/2011 | Nagatsuka et al. ........... 700/245 |
| 7,943,201 | B2 | | 5/2011 | Hendricks, Sr. |
| 8,397,662 | B2 | * | 3/2013 | Herre et al. ................... 118/300 |

(Continued)

FOREIGN PATENT DOCUMENTS

| JP | 11129343 A | 5/1999 |
| KR | 20040018978 A | 3/2004 |

*Primary Examiner* — Dah-Wei Yuan
*Assistant Examiner* — Karl Kurple
(74) *Attorney, Agent, or Firm* — Fraser Clemens Martin & Miller LLC; William J. Clemens

(57) ABSTRACT

A modular tire spraying system includes a downdraft spray booth for receiving a tire, a fluid delivery system disposed in the spray booth, a robot for transporting the tire to the spray booth, and a platform on which each of the spray booth, the fluid delivery system, and the robot is disposed. The fluid delivery system includes at least one spray gun for delivering a coating to the tire.

16 Claims, 4 Drawing Sheets

(56) References Cited

U.S. PATENT DOCUMENTS

| | | | |
|---|---|---|---|
| 2002/0023585 A1* | 2/2002 | Sashihara | 118/313 |
| 2002/0035413 A1* | 3/2002 | Kinoshita et al. | 700/245 |
| 2003/0136338 A1* | 7/2003 | Pohl et al. | 118/326 |
| 2004/0023612 A1 | 2/2004 | Kriesel | |
| 2004/0047995 A1* | 3/2004 | Krueger | 427/346 |
| 2004/0148796 A1* | 8/2004 | Morrison | 34/666 |
| 2005/0068774 A1* | 3/2005 | Pippa et al. | 362/253 |
| 2005/0184016 A1* | 8/2005 | Silverman | 211/87.01 |
| 2005/0247263 A1* | 11/2005 | Pohl et al. | 118/308 |
| 2006/0164825 A1* | 7/2006 | Pippa et al. | 362/147 |
| 2006/0292308 A1* | 12/2006 | Clifford et al. | 427/427.2 |
| 2007/0056510 A1* | 3/2007 | Antaya | 118/326 |
| 2007/0166463 A1* | 7/2007 | Kelly | 427/345 |
| 2007/0281100 A1* | 12/2007 | Herre et al. | 427/407.1 |
| 2009/0031949 A1* | 2/2009 | Nagase et al. | 118/326 |
| 2009/0304940 A1* | 12/2009 | Heldt et al. | 427/427.2 |
| 2010/0008749 A1* | 1/2010 | Spangler et al. | 414/222.13 |
| 2010/0101489 A1* | 4/2010 | Wurster | 118/326 |
| 2010/0272915 A1* | 10/2010 | Laws | 427/421.1 |
| 2011/0162576 A1* | 7/2011 | Schaefer | 118/58 |
| 2012/0094031 A1* | 4/2012 | Schmitt et al. | 427/541 |
| 2012/0325142 A1* | 12/2012 | Takahashi | 118/323 |
| 2013/0074362 A1* | 3/2013 | Lesicka | 34/569 |

* cited by examiner

MODULAR SYSTEM WITH PLATFORMED ROBOT, BOOTH, AND FLUID DELIVERY SYSTEM FOR TIRE SPRAYING

FIELD OF THE INVENTION

This invention relates to a method of and a system for coating green or uncured tires. More particularly, the invention is directed to a system for robotically spraying a coating on predetermined areas both inside and outside green tires.

BACKGROUND OF THE INVENTION

Conventionally, pneumatic rubber tires are produced by molding and curing a green, or uncured, tire in a molding press in which the green tire is pressed outwardly against a mold surface by means of an inner fluid expandable bladder. By this method, the green tire is shaped against the outer mold surface that typically defines the tire's tread pattern and configuration of sidewalls. By application of heat, the tire is cured. Generally, the bladder is expanded by internal pressure provided by a fluid such as hot gas, hot water and/or steam which also participates in the transfer of heat for curing or vulcanization purposes. The tire is then usually allowed to cool somewhat in the mold, sometimes aided by added cold or cooler water to the internal surface of the bladder. Then the mold is opened, the bladder collapsed by removal of its internal fluid pressure and the tire removed from the tire mold. Such tire curing procedure is well known to those having skill in such art.

The use of synthetic rubber compounds in the manufacture of tires makes it necessary to apply suitable coating materials to the rubber surfaces of the fabricated tire carcasses to ensure proper distribution of rubber during the curing operation and the production of finished tires with unblemished surfaces. These coatings are generally liquid in form and are known as lubricants and anti-blemish paints, where the lubricants are applied to the interior surface of a green tire and the anti-blemish paints are applied to the outer surface at the sidewall areas.

The outside green tire paints serve the functions of allowing the rubber to slip as it comes in contact with the metal mold and the paints also serve as a release agent when at the end of the vulcanization cycle, the tire must separate from the mold. Another function of the paint is to provide bleeding of air which becomes trapped between the tire and the mold. Outside green tire paints also aid in the appearance of the finished tire.

Care must be taken that certain areas of the green tire are not coated and that the lubricant employed at the interior of the carcass does not reach any exterior surface of the carcass. Also, applying the coatings manually by either spraying or brushing is time consuming and laborious. Automatic applications, are well known in the art, however, these prior art applications require presorting and separate applicator apparatuses for tire size differences and outer spraying.

A known robotic tire spraying system is described in U.S. Pat. No. 7,943,201 to Hendricks, Sr., the entire disclosure of which is hereby incorporated herein by reference. The system analyzes individual green tires using an integrated vision system. The system controls the robotic spray position, the fan, fluid, atomizing air, and tire rotation speed for optimal spray coverage on both the inside and outside of green tires. The system includes a conveyor, an overhead mounted camera located over an infeed station, and a second camera located perpendicular to the green tire's tread and several feet away from the center of the tire. Pictures of the green tire in the station are used to estimate the center and radius of the tire and locate the angle of the bar code with respect to the center of the tire. Reference points are provided from the camera images and robot positions are calculated to control the spraying.

There is a continuing need for a modular robotic tire spray system for in house or onsite demonstration purposes, operator and maintenance training, trade show use, and for sale as a supplemental tire spraying system.

SUMMARY OF THE INVENTION

In concordance with the instant disclosure, a modular robotic tire spray system for in house or onsite demonstration purposes, operator and maintenance training, trade show use, and for sale as a supplemental tire spraying system, has surprisingly been discovered.

The present invention is a modular unit for spraying a mold release on a green tire after the tire build process and before the tire molding process. The unit is a portable skid mounted system including at least one of a conveyor, a robot, a controller, an end of arm tire gripper, a spray gun, a fluid delivery system, a spray booth, a filter system, an exhaust fan, a perimeter safety fence, a vision system with cameras, light array measuring sticks, and a bar code reader.

In operation, a tire is conveyed or manually loaded onto a robotic spray system conveyor. The tire is measured either by a camera, light array, or barcode, with data transferred to controller prior to the spray. The robot picks the tire from the conveyor and places the tire into the spray booth. The tire position relative to the spray gun, fan width, atomizing air, rotation speed, and spray volume is calculated by the robot controller on a per tire basis, for example, based on the data obtained. The tire is sprayed at least one of inside and outside with the proper amount of mold release. The tire is then placed back onto the conveyor, tire rack, or other transfer device by the robot.

Advantages of the present invention include a modular design, a portable skid, precision spray, minimized material usage, uniform spray coverage, improved spray quality, minimal overspray, minimal moving parts, minimal maintenance, and a single controller. Cycle time is further expected to be improved, for example, up to approximately 4-5 tires per minute, or more.

In one embodiment, a modular tire spraying system includes a downdraft spray booth for receiving a tire, a fluid delivery system disposed in the spray booth, a robot for transporting the tire to the spray booth, and a platform on which each of the spray booth, the fluid delivery system, and the robot is disposed. The fluid delivery system includes at least one spray gun for delivering a coating to the tire.

In another embodiment, a downdraft spray booth for receiving a tire includes a pan disposed beneath a fluid delivery system of a tire spraying system. The pan has a plurality of apertures formed therein, through which an overspray from the fluid delivery system is caused to flow. An exhaust fan is in fluid communication with the pan and causes the overspray from the fluid delivery system to flow through the apertures of the pan.

In a further embodiment, a method for spraying a coating on a tire includes the steps of: providing a modular tire spraying system including downdraft spray booth for receiving the tire, a fluid delivery system disposed in the spray booth, wherein the fluid delivery system includes at least one spray gun for delivering the coating to the tire, a robot for transporting the tire to the spray booth, and a platform on which each of the spray booth, the fluid delivery system, and the robot is disposed; and loading the tire into the downdraft spray booth using the robot. The tire is then rotated using the robot, and sprayed with the coating using the fluid delivery system. Following spraying, the tire is removed from the spray booth portion using the robot.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE EMBODIMENTS

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
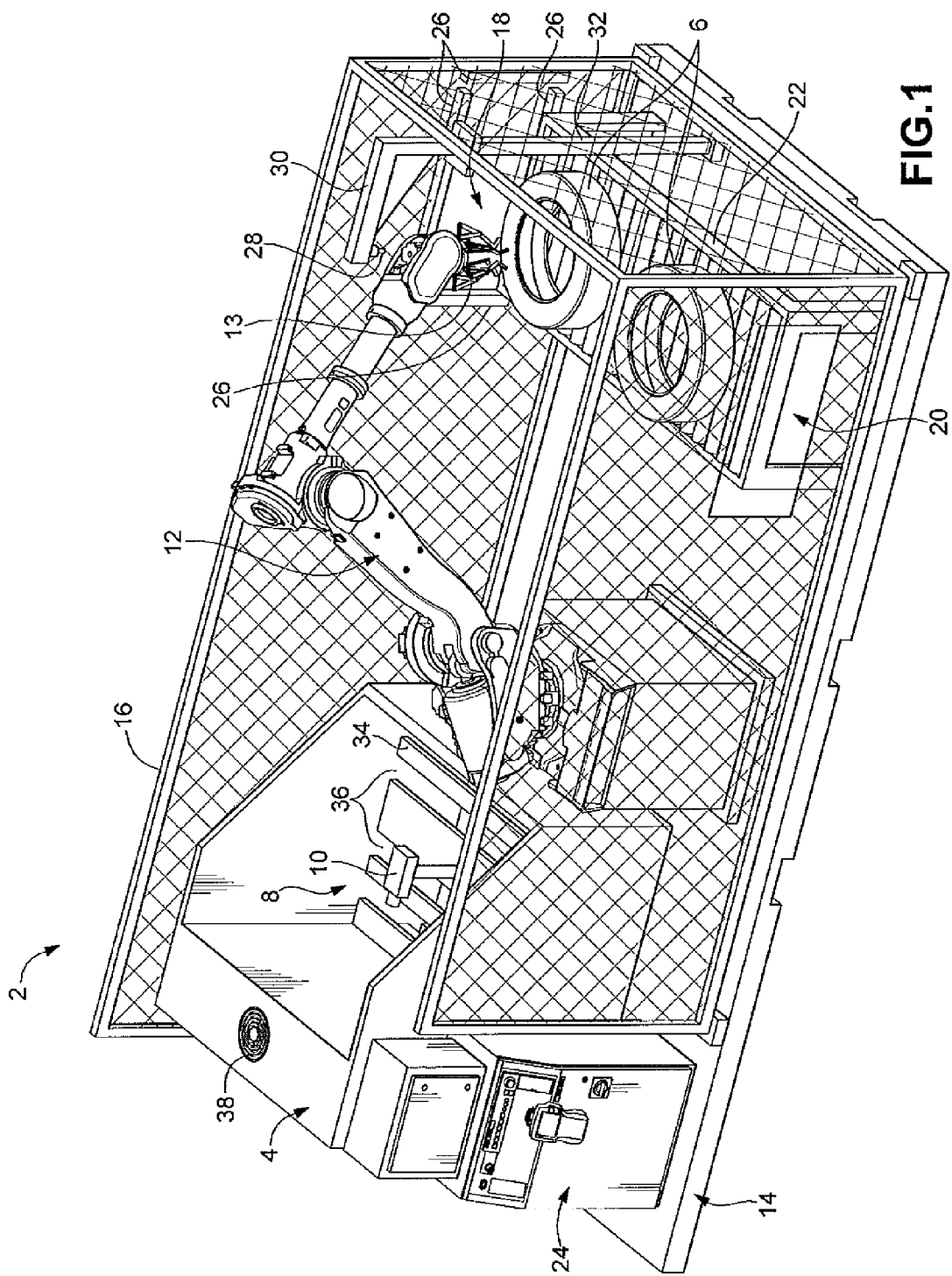
FIG. 1 is a side perspective view of a modular tire spraying system according to one embodiment of the present disclosure.
Figure 2:
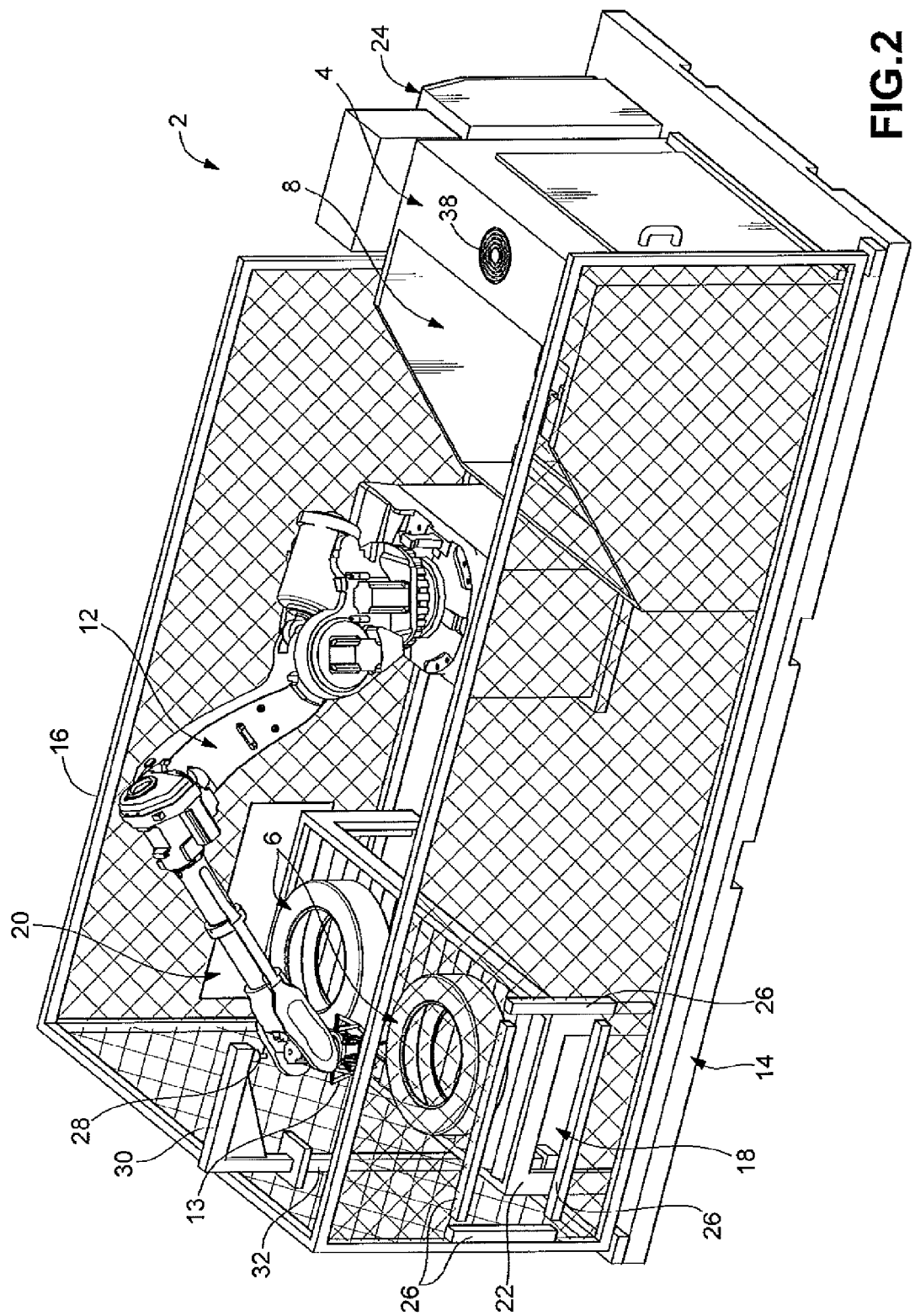
FIG. 2 is another side perspective view of the modular tire spraying system shown in FIG. 1.
Figure 3:
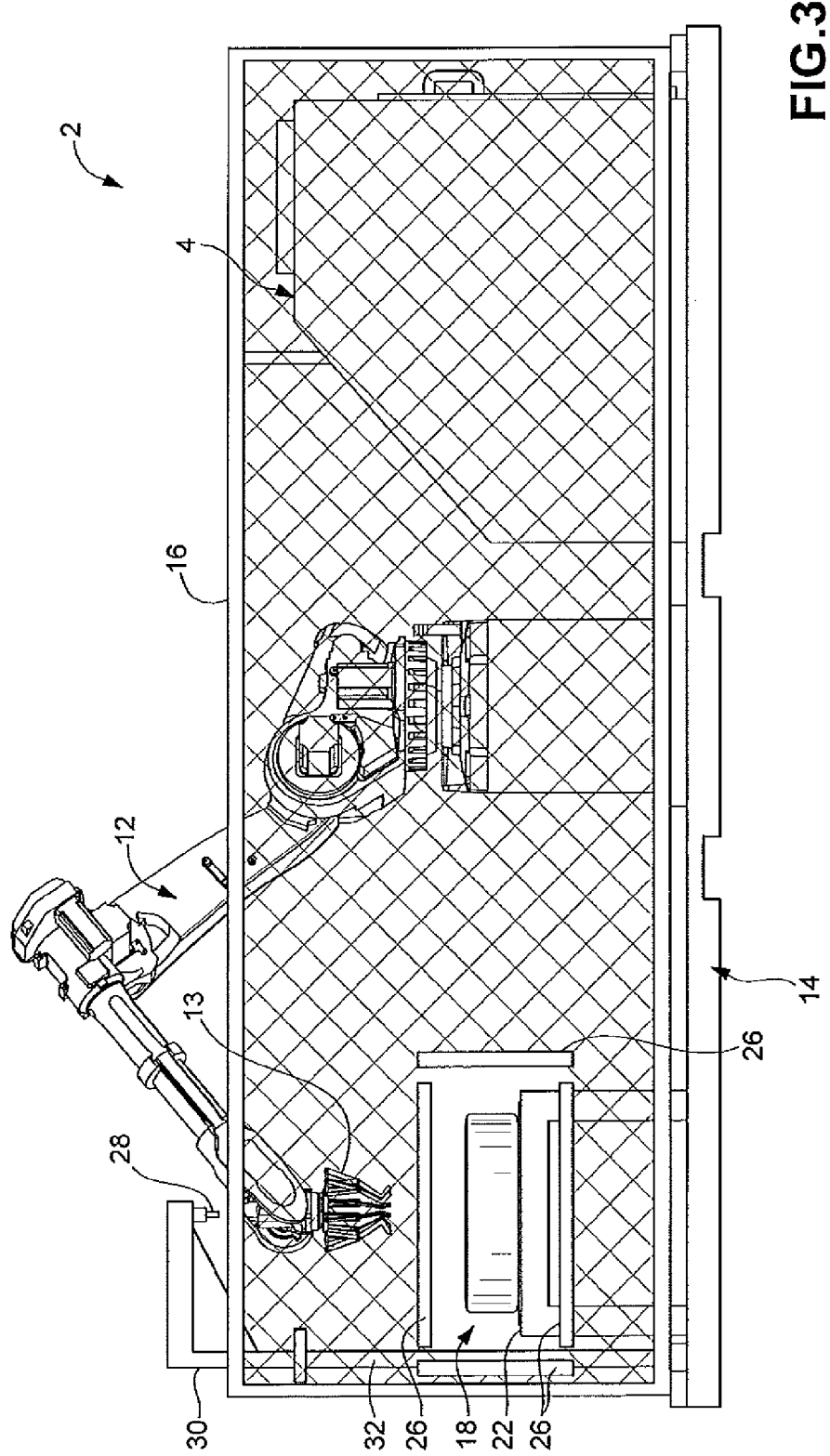
FIG. 3 is a side elevational view of the modular tire spraying system shown in FIG. 2.

FIGS. 1-3 show a modular tire spraying system 2 according to one embodiment of the present disclosure. The modular tire spraying system 2 includes a downdraft spray booth 4 for receiving a tire 6, a fluid delivery system 8 with at least one spray gun 10, and a robot 12. The tire 6 is a green or uncured tire that requires coating prior to a molding or curing operation to manufacture a final tire product (not shown).

The fluid delivery system 8 is disposed in the spray booth 4. The fluid delivery system 8 includes the at least one spray gun 10 for delivering a coating 11 (FIG. 4) to the tire 6. Although the spray gun 10 is shown as being unidirectional and fixed-position in FIG. 1, it should be appreciated that the spray gun 10 may alternatively be mobile, for example, attached to a spraying robot (not shown). Similarly, although the spray gun 10 may be being disposed inside the tire 6 for coating an inside of the tire 6, when the tire 6 is positioned within the spray booth 4, disposition of the spray gun 10 adjacent an outer wall of the spray booth 4 may be employed to coat an outside of the tire 6, as desired.

The robot 12 of the modular tire spraying system 2 is configured to selectively transport the tire 6 to and from the spray booth 4. As shown in FIGS. 1-3, the robot 12 may be multi-axis machine. Nonlimiting but suitable examples of the robot 12 may include one of a 4-, 5-, and 6-axis robot. The robot 12 has a gripper 13 that allows the robot 12 to selectively pick up the tire 6. The gripper 13 may also be rotatable, and facilitate a rotation of the tire 6 by the robot 12 during a coating operation. The positioning of the tire 6 and the rate of rotation of the tire 6 may be finely controlled by the robot 12. In particular embodiments, the robot 12 is the only component of the modular tire spraying system 2 responsible for moving the tire 6 during the spraying operation. The use of other types or robots and related machines for moving the tire 6 is also within the scope of the present disclosure.

Being modular, and thus portable, the modular tire spraying system 2 of the present disclosure includes a platform 14 for transport of the modular tire spraying system 2. Each of the spray booth 4, the fluid delivery system 8, and the robot 12 is disposed on the platform 14. In a particular embodiment, the platform 14 is a portable skid configured to be moved by a skid loader or like equipment. The platform 14 permits a convenient transport and rapid installation of the modular tire spraying system 2 at a facility where tires 6 are to be painted.

A safety fence 16 may be disposed around at least a portion of the platform 14, including at least one of the spray booth 4, the fluid delivery system 8, and the robot 12, as desired. In certain embodiments, the safety fence 16 is disposed around at least a portion of a perimeter of the platform 14. In an illustrative embodiment, the safety fence 16 includes an entry gate 18 and an exit gate 20. The tire 6 is transported to the modular tire spraying system 2, prior to spraying, through the entry gate 18. Following spraying, the tire 6 is transported from the modular tire spraying system 2 through the exit gate 20.

The transportation of the tire 6 through the modular tire spraying system 2 may be performed with conveying equipment such as a conveyor 22. The conveyor 22 may include at least one of a powered belt conveyor and a non-powered roller conveyor, for example. In particular, the conveyor 22 is disposed between the entry gate 18 and the exit gate 20, and further disposed on the platform 14, for disposition of the tire 6 adjacent the robot 12 for the spraying operation. It should be appreciated that the tire 6 may be manually loaded onto the conveyor 22 of the modular tire spraying system 2, through the entry gate 18. Additional conveyors, belts, and other transportation systems outside of the modular tire spraying system 2 may be employed to deliver and retrieve the tire 6 from the conveyor 22 of modular tire spraying system 2, as desired.

In certain embodiments, the modular tire spraying system 2 includes a controller 24 for operating at least one of the robot 12 and the at least one spray gun 10 when spraying the tire 6 with the coating 11. The controller 24 may also include a memory unit and one or more central processing units, and be used to calculate spray parameters for each individual tire 6, for example, based upon measurements, barcode readings, and the like. In particular, the tire position relative to the spray gun, fan width, atomizing air, rotation speed, and spray volume may be calculated by the controller 24 on a per-tire basis. The controller 24 may also have a terminal that permits an establishment of settings or manual operation of the modular tire spraying system 2. The controller 24 may be disposed on the platform 14, or may be disposed a separate location apart from the platform 14, as desired.

The controller 24 may be in communication with at least one sensing device 26, 28. For example, the at least one sensing device 26, 28 may include a light array system 26 for measuring the dimensions of the tire 6 prior to spraying the tire 6 with the coating 11. The light array system 26 may include at least one light emitter and at least one light receiver. The light array system 26 may be disposed on the safety fence 16, for example, adjacent the entry gate 18 formed in the safety fence 16. In the particular embodiment shown in FIGS. 1-3, the light array system 26 includes a vertical light emitter and a vertical light receiver, and a horizontal light emitter and a horizontal light receiver. The light array system 26 may be employed to measure at least one of an inner diameter, an outer diameter, and a profile of the tire 6 delivered through the entry gate 18. The measurement data from the light array system 26 is then sent to the controller 24, which uses the measurement data in calculating spray parameters and controlling the at least one of the spray gun 10 and the robot 12 accordingly.

In another example, the at least one sensing device 26, 28 is a camera 28. The camera 28 may be used to generate an image of the tire 6, which is delivered to the controller 24 for calculating spray parameters. The camera 28 may be disposed to a side of the tire 6 or overhead of the tire 6, as desired. As with the measurements obtained by the light array system 26, the image generated by the camera 28 may be used by the controller 24 in operating the at least one spray gun 10 and the robot 12 of the modular tire spraying system 2.

As shown in FIGS. 1-3, the camera 28 when overhead may be disposed on an arm 30. The arm 30 normally extends upwardly from the modular tire spraying system 2 and over top of the tire 6 when loaded into the modular tire spraying system 2. The arm 30 permits a generating of the image of the tire 6 from above the tire 6, as the tire 6 enters the modular tire spraying system 2. As a nonlimiting example, the arm 30 may be substantially L-shaped, although other suitable shapes for the arm 30 may also be used.

Advantageously, the arm 30 may be collapsed, for example, telescopically or at a hinge point, or removed, for example, by pulling a pin (not shown) connecting the arm 30 to a lower support 32 mounted on the platform 14, in order that the modular tire spraying system 2 may be readied for transport. Although the camera 28 is shown being the only sensing device 26, 28 attached to the arm 30, it should be understood that the light arrays 26, or other sensing devices such as barcode readers, radio-frequency identification scanners, and the like, may also be attached to the arm 30 within the scope of the present disclosure.

Figure 4:
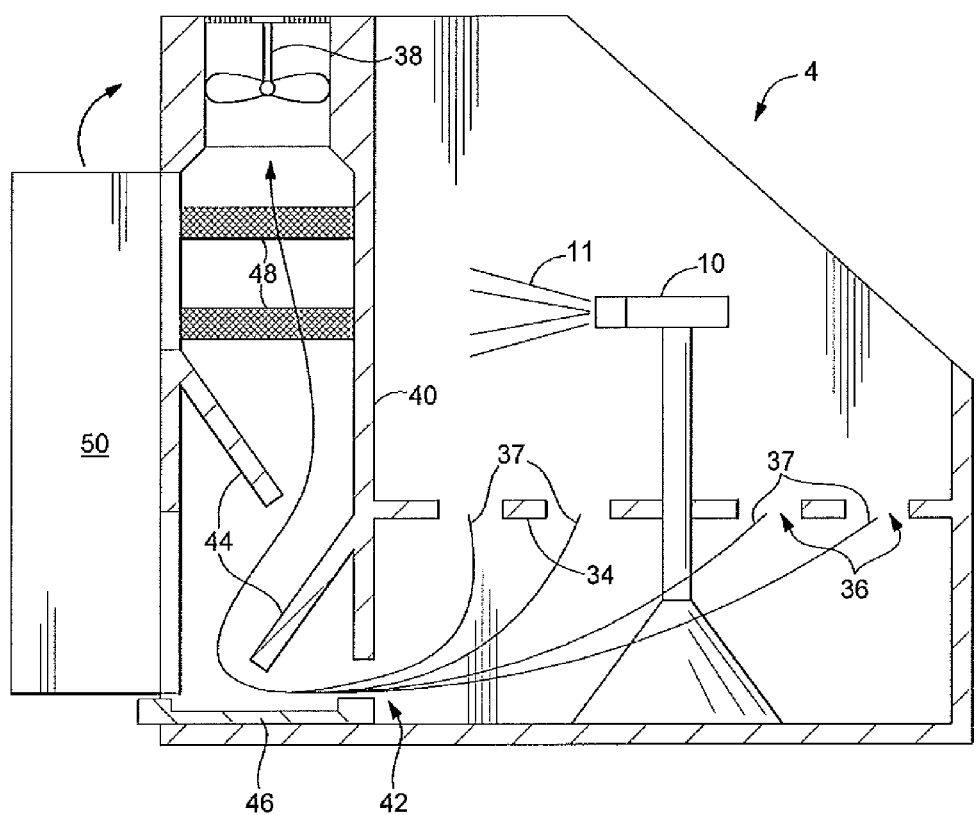
FIG. 4 is a cross-sectional side elevational view of a downdraft spray booth for the modular tire spraying system shown in FIGS. 1-3.

With reference to FIG. 4, the downdraft spray booth 4 of the modular tire spraying system 2 is shown in further detail. The downdraft spray booth 4 includes a pan 34 beneath the fluid delivery system 8. The pan 34 has a plurality of apertures 36 formed therein. For example, the apertures 36 may be elongate slots formed in a base of the pan 34. The sizes, shapes, and suitable number of the apertures 36 may be selected by a skilled artisan. An overspray 37 from the fluid delivery system 8 is caused to flow through the apertures 36 during the spraying operation in which the tire 6 is coated.

In particular, the overspray 37 from the fluid delivery system 8 is caused to flow through the apertures 36 due to operation of an exhaust fan 38 in fluid communication with the pan 34. For example, the exhaust fan 38 may be disposed atop a manifold 40 of the downdraft spray booth 4. The manifold 40 has an opening 42 open at a base of the downdraft spray booth 4 underneath the pan 34. In operation, the exhaust fan 38 pulls air, including the overspray 37, from a region of the tire 6 being sprayed, through the apertures 36 in the pan 34, into the opening 42 and through the manifold 40, and out of the manifold 40 into the surrounding atmosphere through the exhaust fan 38.

Advantageously, the downdraft spray booth 4 of the present disclosure permits an installation of the modular tire spraying system 2 in a facility without requiring connection of the modular tire spraying system 2 to pre-existing exhaust systems of the facility. The downdraft spray booth 4 removes substantially all of the overspray 37 that may occur during the spraying operation of the tire 6 from the air being exhausted from the exhaust fan 38.

For removing the overspray 37 from the air drawn into the manifold 40, the downdraft spray booth 4 may include a plurality of fixed baffles 44 disposed in the manifold 40 between the pan 34 and the exhaust fan 38. The overspray 37 from the fluid delivery system 8 is drawn into the manifold 40 by the exhaust fan 38, and condenses on the baffles 44 as it flows past the baffles 44. The condensed overspray 37 then drips into a removable clean out tray 46 disposed beneath the fixed baffles 44. The clean out tray 46 is configured to collect the overspray 37, and may be removed and replaced during regular maintenance of the modular tire spraying system 2.

The downdraft spray booth 4 may also include a filter system 48 disposed between the fixed baffles 44 and the exhaust fan 38. The filter system 48 removes any residual overspray 37 from the fluid delivery system 8 after the residual overspray 37 has flowed past the fixed baffles 44. As a nonlimiting example, the filtering system 48 may include a bank of removable filters. The filters may be formed from a nonwoven or fibrous filter media. Other suitable filter media for the filtering system 48 may also be employed, as desired.

As with the clean out tray 46, the filtering system 48 may be subject to regular maintenance. To facilitate such maintenance, a door 50 may be disposed on the manifold 40 adjacent at least one of the baffles 44, the clean out tray 46, and the filtering system 48. The door 50 permits access to an interior of the manifold 40 when opened, for maintenance purposes, but is substantially fluid tight when closed in order that air may be drawn downwardly through the pan 34 and out through the exhaust fan 38 during an operation of the downdraft spray booth 4.

The present disclosure further includes a method for spraying a coating on the tire 6. The method first includes the step of providing the modular tire spraying system 2, as described hereinabove. The tire 6 is loaded into the downdraft spray booth 4 using the robot 12. The robot 12 further rotates the tire 6 so that the tire 6 may be sprayed with the coating 11 using the fluid delivery system 8. Following the coating operation, the tire 6 is removed from the downdraft spray booth 4 using the robot 6.

In a particular embodiment, the platform 14 is a portable skid, and the modular tire spraying system 2 is first provided by delivering the portable skid to a floor of a tire manufacturing location or facility.

The modular tire spraying system 2 of the present disclosure advantageously may be employed for in-house or onsite demonstration purposes, operator and maintenance training, trade show use, and for sale as a supplemental tire spraying system that may be installed with minimal effort.

While certain representative embodiments and details have been shown for purposes of illustrating the invention, it will be apparent to those skilled in the art that various changes may be made without departing from the scope of the invention, which is further described in the following appended claims.

What is claimed is:

1. A modular tire spraying system, comprising:
a downdraft spray booth for receiving a tire;
a fluid delivery system disposed in the spray booth, wherein the fluid delivery system includes at least one spray gun for delivering a coating to the tire;
a robot for transporting the tire to the spray booth; and
a portable platform on which all of the spray booth, the fluid delivery system, and the robot are disposed, wherein the spray booth is mounted to the platform at a spray booth location, the robot is mounted to the platform at a mounting location spaced apart from the spray booth location, and the robot is configured to transport the tire to and from the spray booth and a conveying location on the platform, the mounting location disposed between the spray booth location and the conveying location, wherein the mounting location and the conveying location are aligned along a first axis on the platform, and the tire is introduced to the conveying location from outside the platform along a second axis transverse to the first axis, and wherein the robot is a multi-axis robot having a rotatable gripper configured to selectively pick up and release the tire at the conveying location, dispose the tire within the spray booth and rotate the tire during the delivery of the coating by the spray gun.

2. The modular tire spraying system of claim 1, further including a controller for operating the robot and the at least one spray gun when delivering the coating to the tire, the controller also disposed on the platform.

3. The modular tire spraying system of claim 2, including at least one sensing device in communication with the controller.

4. The modular tire spraying system of claim 3, wherein the at least one sensing device includes one of a light array system for measuring dimensions of the tire and a camera for generating an image of the tire.

5. The modular tire spraying system of claim 1, wherein the at least one spray gun is fixed in position.

6. The modular tire spraying system of claim 1, wherein the platform is a portable skid.

7. The modular tire spraying system of claim 1, including a safety fence disposed on the platform.

8. The modular tire spraying system of claim 7, wherein the safety fence has an entry gate through which the tire is transported to the modular tire spraying system, and an exit gate through which the tire is transported from the modular tire spraying system.

9. The modular tire spraying system of claim 8, including a conveyor disposed between the entry gate and the exit gate, the conveyor disposed on the platform at the conveying location.

10. The modular tire spraying system of claim 9, wherein only the robot moves and transports the tire on and off the conveyor within the modular tire spraying system.

11. The modular tire spraying system of claim 1, wherein the downdraft spray booth includes a pan beneath the fluid delivery system, the pan having a plurality of apertures formed therein through which an overspray from the fluid delivery system is caused to flow.

12. The modular tire spraying system of claim 11, wherein the downdraft spray booth includes an exhaust fan in fluid communication with the pan and causing the overspray from the fluid delivery system to flow through the apertures of the pan.

13. The modular tire spraying system of claim 12, wherein the downdraft spray booth includes a plurality of fixed baffles disposed between the pan and the exhaust fan, the overspray from the fluid delivery system flowing past and condensing on the baffles.

14. The modular tire spraying system of claim 12, wherein the downdraft spray booth includes a filter system disposed between the pan and the exhaust fan for filtering the overspray from the fluid delivery system.

15. The modular tire spraying system of claim 12, wherein the downdraft spray booth includes a removable clean out tray configured to collect the overspray that condenses.

16. The modular tire spraying system of claim 12, wherein the downdraft spray booth includes an access door for performing maintenance.

* * * * *